United States Patent Office 2,922,154
Patented Jan. 19, 1960

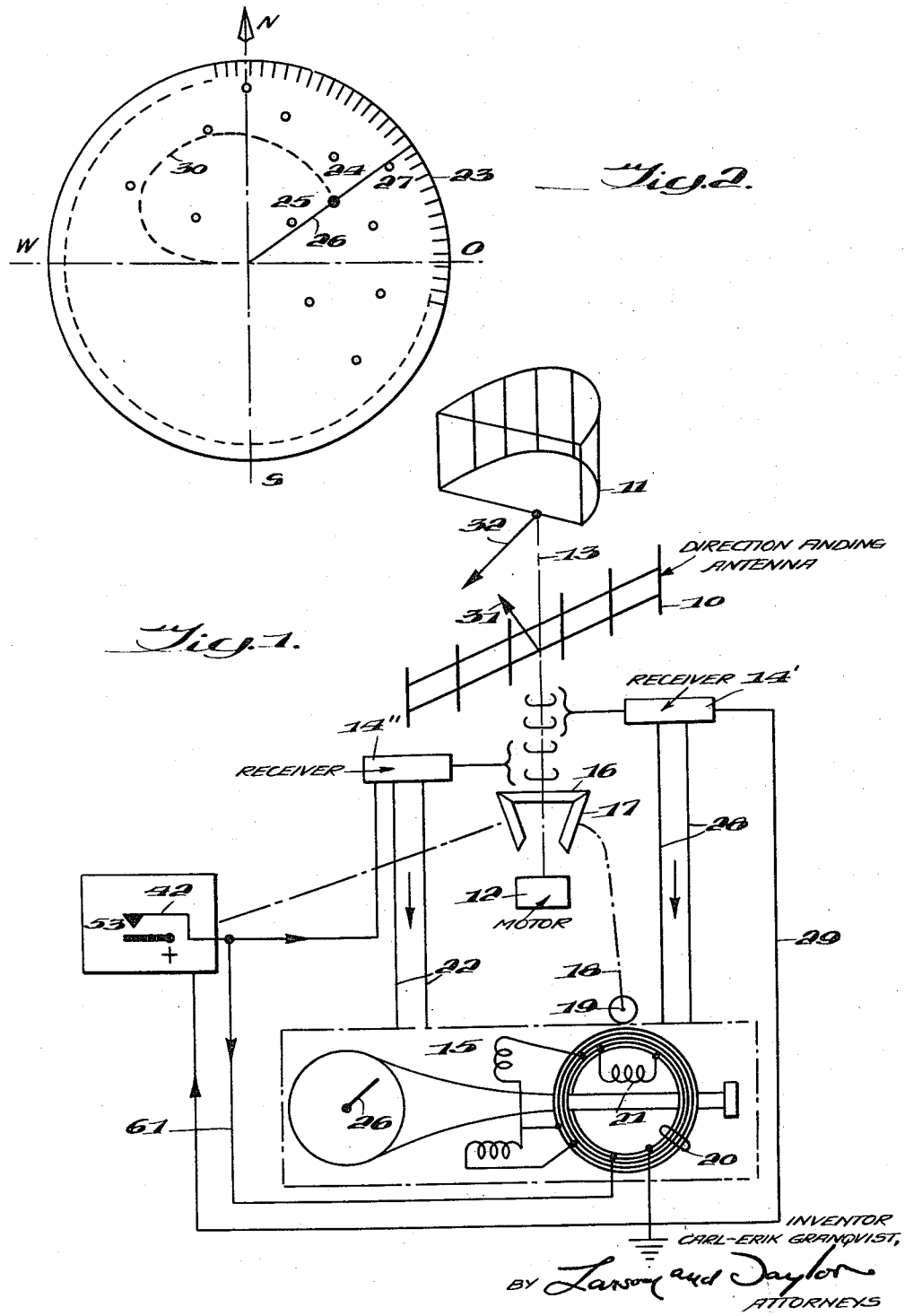

2,922,154
ARRANGEMENT IN CONSTRUCTIONS FOR AUTOMATIC RADIO DIRECTION FINDING

Carl-Erik Granqvist, Lidingo, Sweden

Application September 22, 1953, Serial No. 381,595

Claims priority, application Sweden October 6, 1952

1 Claim. (Cl. 343—6)

There have been proposals made for an arrangement for automatic radio direction finding, in which a directed antenna system is arranged to receive, during rotation, an input signal in the form of an indication on an indicator means, for instance a cathode ray tube, in which a field is created, rotating synchronously and in phase with the rotation of the antenna system, in order to indicate the direction of the input signal. Measuring devices are thereby arranged for measuring the mean pulse time, i.e. half the duration of the direction finding pulse, received from the antenna system, together with the whole distance in time from a given point on the direction finding pulse to a moment, given in relation to the rotation period of the antenna system, and also for delivering, to the indication means, a distinct marking pulse at the end of the pulse time.

By means of such an arrangement a line is obtained on the indicator, for example, a cathode ray tube, which line runs from the center to the periphery of the screen and, with high degree of precision, indicates the direction to the transmitter place which is being found. It is now possible to complete such a construction with rather simple means so that it also indicates the distance to said transmitter place, the position of the transmitter place thus being distinctly indicated in a polar coordinate system.

The present invention refers to an arrangement for this purpose. According to the invention a radar equipment is connected to the direction finding construction in such a way that the rotating antenna system for the direction finding system rotates synchronously with a radar antenna, this antenna, however, being displaced from the direction finding antenna with an angle corresponding to the approximate maximum value of the mean pulse time. The input radar beam, after being received and amplified, is made to influence a deviation means in the cathode ray tube in such a way that the radial distance from the center of the indicator to the point marked by the radar beam corresponds to the distance between the receiver and the transmitter at the direction finding point.

According to a preferred form of the invention, the input direction finding beam is made momentarily to influence an arrangement for amplification control of the input radar signal, so that the radar picture of the found direction finding transmitter on the screen of the cathode ray tube, is indicated with greater intensity.

The arrangement according to the invention is especially suitable when a number of airplanes are centrally directed and are to be supervised. When these airplanes approach an airfield, a normal radar equipment is usually arranged for indicating their positions on a radar screen. On given occasions a rather great number of such pictures, corresponding to airplanes, may be reproduced, for instance when a whole flying squadron is approaching the same locale, and it may be very difficult for the ground command to identify the different airplanes. It might for instance occur that two or more airplanes are on the same radial bearing from the radar antenna, and it is then of little use that the management gets into direction finding contact with one of these airplanes, as it is nevertheless impossible for direction purposes to identify with which of the airplanes direction finding contact has been established. This inconvenience is avoided according to the present invention. The direction finding usually takes place by means of an identity signal, transmitted from the airplane, this signal thus indicating the transmitting airplane. Its bearing is indicated by means of the above mentioned arrangement, and by means of the arrangement according to the present invention the radar picture is marked by the airplane, the bearing of which is being determined and the identity signal of which is being received, with increased intensity, thereby clearly determining the position and identity of the plane. This determination is of great value for the ground command for giving the pilot further instructions.

It might for instance occur that the plane has reported that its remaining petrol supply is scarce and that just this plane should therefore be taken down before its turn. In a fog, however, the airplane cannot see the other airplanes in the vicinity, but the ground command distinguishes them on its radar screen. This information would, however, be of little value for the ground command, if it could not with full accuracy identify the position of the plane, known from the identity signal, so that instructions can be given about direction, height and so on for landing without danger. Also other situations may arise, when it might be of the greatest importance, from the point of view of safety, to be able to observe simultaneously not only the position of all the airplanes, present in the adjacent air, but also the exact position of an airplane, the identity of which is known. These airplanes, when first observed, can be observed on the radar screen only as rather weak, featureless points. It may occur that such a weak point falls so completely within the bearing line, drawn on the radar screen by means of the direction finding arrangement, that it can no longer be observed against the background of this line, which is nevertheless of a certain breadth and intensity (light intensity). It is then no longer possible to observe the position, but only the bearing of the special airplane, with which communication is just then going on, but it is as a rule especially important to get full information about the position of this plane, as the report, transmitted from the airplane, on the carrier current of which the direction finding takes place, usually concerns measures on land or in the air, which require complete knowledge about the exact position.

The invention is further described below with reference to the attached drawing, showing the arrangement, indicated above, and applied and enlarged according to the present invention. Although the present invention is thereby described in connection with a special form of execution, it is of course not limited hereto, but various modifications may occur within the framework of the invention.

In the drawings Fig. 1 shows schematically a picture of the arrangement, drawn in block form; and Fig. 2 shows an example of the picture which might arise on the screen of the cathode ray tube, used both for direction finding and for radar purposes.

With reference to Fig. 1 antenna system 10 controls reception of the direction finding signal. A second antenna system 11 is arranged on the same shaft 13, which is rotated mechanically from a motor 12. The feed down conduit from the antenna systems is connected to receivers 14′ and 14″, respectively, which receivers are connected to a cathode ray tube 15.

A description will first be given of the operation of the system relative to the production of an indication of the bearing to the transmitting craft, for instance an airplane. A picture of the cigar-formed direction characteristic from the antenna system 10 should thereby normally be obtained on the screen of the cathode ray tube, but the conductors 28 between the receiver 14' and the cathode ray tube valve 15 could be left out so that the reproduction of the direction characteristic would be suppressed. The rotation of the field in the cathode ray tube may be obtained in any arbitrary way, for instance from the shaft 13 by means of a cog-gear 16—17, the latter one of said gearing wheels driving a shaft 18, which by means of a pulley 19 rotates the deviation means of the cathode ray tube synchronously with and in a fixed angular relation to the rotation of the antenna system 10.

The same deviation means right be used for the direction finding function and for reception of the radar beam, but it is also possible to use different deviation means for these two functions. The latter is assumed to be the case in the arrangement, shown in Fig. 1. The deviation means are, however, connected to a set of contact rings 20, two of which are connected to a special deviation means 21 for transfer of pulses according to the present invention for indication of the bearing direction. For transfer of these pulses to the cathode ray tube a conductor 29 runs to a device 42 for measuring time, a pulse being produced by closing a contact 53 almost at the middle of the pulse which passes through the conductors 28 and the conductor 29, respectively. This pulse is transferred to the special deviation means 21 in the cathode ray tube 15 over the conductor 61 through a circuit to be described hereinafter. Consequently, a line 26 is drawn on the screen of the cathode ray valve, indicating the direction or bearing to the transmitting craft, the direction of which is to be measured.

It might now occur that there is a great number of craft of a similar kind within the area, being scanned by the antennae 10 and 11. These craft will be indicated on the screen of the same cathode ray valve by means of the radar arrangement, the radar antenna 11 thereby, over two further contact rings on the shaft 13, being connected to a radar equipment, indicated in its general form in block diagram at 14". This radar equipment is, as usual, arranged to transmit pulses with given intervals of time, these pulses after reflection being received by the antenna 11, amplified by means of the receiving part of the device 14" and, over conductors 22, transmitted to the deviation means, attached to the cathode ray valve 15 and intended for radar use. The points on the radar screen 23, see Fig. 2, indicate the position in the air of the craft, causing the reflection. It might now occur that these points in combination with the line 26 are insufficient for indicating, with necessary accuracy, which of the craft in question is just sending the signal which is received for direction finding purposes. An example hereof is shown in Fig. 2, where it is assumed that a squadron of airplanes is approaching a landing place, represented by the center of the screen 23 of the cathode ray valve. In order that the ground command shall be able to inform the several airplanes about the succession in which they ought to make their landing manoeuvres, it is, however, necessary to be able not only to identify, with perfection, each separate airplane, but also to determine which of the airplanes, visible on the radar screen, is the thus identified airplane. In the case, illustrated in Fig. 2, three airplanes are thus situated within the quadrant west to north, one airplane in direction straight northwards, six airplanes within the quadrant north to east and three further airplanes within the quadrant east to south. Of the six airplanes, situated within the quadrant north to east, three are situated practically exactly on the indicated direction finding line 26, and the ground command must therefore learn with which of these airplanes, already identified by the identification signal, on which direction finding has been performed, it is communicating by radio.

For this purpose the pulse conductor 61 is connected with the amplifier in the radar equipment, where it influences the existing volume control for intermittent increase of the amplification at the moment when the direction finding beam from the airplane passes its position through the center line of the cigar-formed direction characteristic for the antenna system 10. This causes the special airplane in question to be marked more clearly than the other airplanes, visible on the radar picture, as is shown by the amplified picture 24 compared with the airplanes 25 and 27 in approximately the same bearing direction.

If for instance this airplane shall be taken down before its turn, for instance because of lack of fuel, the ground command can by radio instruct the six airplanes, situated north and west thereof, respectively, to climb to a height, safe for the taking down of the airplane 24, whereafter the airplane 24 can complete its circuit for approaching, for instance, from the west, as indicated by the dotted line 30. It is easy to see that, if such an instruction is not given to the other airplanes, there would be danger of collision between the airplane 24 and each of the mentioned airplanes north and west thereof, respectively, if these should by chance, during their waiting manoeuvres, enter the path 30.

The time measuring device 42 the details of construction of which are fully disclosed in my copending application Serial No. 306,597, filed August 27, 1952, for "Arrangements in Automatic Radio Direction Finding Systems," now Patent No. 2,730,716, for reasons which do not concern the present invention functions in such a way that the line 26 is drawn a certain given time after the direction characteristic of the direction finding antenna 10 has passed the field, within which the airplane 24 is situated. As the antenna systems rotate at a constant, known speed, this time is, however, represented by a given angle, and it is therefore necessary to introduce a corresponding difference in angle between the shaft directions of the two antenna systems 10 and 11. The difference in angle is in the drawing shown by indicating the radiation axis of the two antenna systems by the arrow 31 for the direction finding antenna system 10 and by the arrow 32 for the radar antenna system 11.

Obviously many modifications and variations of the present invention are possible in light of the above teaching. What is claimed as new and desired to be secured by Letters Patent is:

A system for correlating intelligence from radar and direction finding equipments including synchronously operating antennas and for recording the intelligence on a single cathode ray tube comprising means for measuring signals from the direction finding antenna including means for transmitting pulses to the cathode ray tube, said pulses differing with predetermined time displacement with respect to said signals, and means for simultaneously producing a trace on the cathode ray tube of signals from the radar equipment, said transmitting means including means for increasing the amplification of the trace produced by the radar equipment in response to the input of said pulses, the radar and direction finding antennas being angularly offset by an angle corresponding to the time displacement of said pulses.

References Cited in the file of this patent

UNITED STATES PATENTS

| | | |
|---|---|---|
| 2,426,182 | Lange | Aug. 26, 1947 |
| 2,428,793 | Fay | Oct. 14, 1947 |
| 2,572,975 | Berger et al. | Oct. 30, 1951 |
| 2,597,895 | Novy | May 27, 1952 |
| 2,619,633 | Boario | Nov. 25, 1952 |
| 2,633,568 | Greene | Mar. 31, 1953 |
| 2,654,085 | Goldstein | Sept. 29, 1953 |
| 2,745,096 | Jensen | May 8, 1956 |

UNITED STATES PATENT OFFICE

CERTIFICATE OF CORRECTION

Patent No. 2,922,154                  January 19, 1960

Carl-Erik Granqvist

It is hereby certified that error appears in the above numbered patent requiring correction and that the said Letters Patent should read as corrected below.

In the grant, lines 1, 2 and 3, for "Carl-Erik Granqvist, of Lidingo, Sweden," read -- Carl-Erik Granqvist, of Lidingo, Sweden, assignor to Svenska Aktiebolaget Gasaccumulator, of Lidingo (near Stockholm), Sweden, a corporation of Sweden, --; line 12, for "Carl-Erik Granqvist, his heirs" read -- Svenska Aktiebolaget Gasaccumulator, its successors --; in the heading to the printed specification, line 4, for "Carl-Erik Granqvist, Lidingo, Sweden" read -- Carl-Erik Granqvist, Lidingo, Sweden, assignor to Svenska Aktiebolaget Gasaccumulator, Lidingo (near Stockholm), Sweden, a corporation of Sweden --.

Signed and sealed this 14th day of June 1960.

(SEAL)
Attest:

KARL H. AXLINE

Attesting Officer

ROBERT C. WATSON
Commissioner of Patents